United States Patent
Takagi et al.

(10) Patent No.: US 9,387,636 B2
(45) Date of Patent: Jul. 12, 2016

(54) METHOD AND APPARATUS FOR REPAIRING HONEYCOMB CORE SANDWICH PANEL

(71) Applicant: MITSUBISHI AIRCRAFT CORPORATION, Aichi (JP)

(72) Inventors: Katsumi Takagi, Tokyo (JP); Masayoshi Suhara, Tokyo (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 14/227,211

(22) Filed: Mar. 27, 2014

(65) Prior Publication Data

US 2014/0290851 A1 Oct. 2, 2014

(30) Foreign Application Priority Data

Mar. 28, 2013 (JP) ................................. 2013-069369

(51) Int. Cl.
  *B29C 65/00* (2006.01)
  *B29C 73/12* (2006.01)
  *B29C 73/10* (2006.01)
  B29K 301/10 (2006.01)
  B29L 31/30 (2006.01)

(52) U.S. Cl.
  CPC ............... *B29C 73/12* (2013.01); *B29C 73/10* (2013.01); *B29K 2301/10* (2013.01); *B29L 2031/3076* (2013.01)

(58) Field of Classification Search
  CPC ................................ B29C 73/10; B29C 73/12
  See application file for complete search history.

(56) References Cited

U.S. PATENT DOCUMENTS

| 1,806,861 | A | * | 5/1931 | Owen | B32B 17/10844 100/211 |
|---|---|---|---|---|---|
| 2,698,273 | A | * | 12/1954 | Miner et al. | 156/282 |
| 4,623,419 | A | * | 11/1986 | Price | B29C 66/49 100/211 |
| 6,149,749 | A | * | 11/2000 | McBroom | B29C 73/02 156/87 |
| 6,355,203 | B1 | * | 3/2002 | Charmes et al. | 264/493 |
| 2003/0075259 | A1 | * | 4/2003 | Graham | 156/94 |
| 2010/0307372 | A1 | * | 12/2010 | Remick | B32B 43/00 105/343 |

FOREIGN PATENT DOCUMENTS

JP 03-264356 A 11/1991

* cited by examiner

*Primary Examiner* — John Goff
(74) *Attorney, Agent, or Firm* — Pearne & Gordon LLP

(57) ABSTRACT

A repair method according to the present invention is a method for repairing a honeycomb core sandwich panel, the method including: a repair patch disposing step of disposing a repair patch and an adhesive on at least one of a first surface and a second surface of the panel, the first outer skin being located on the first surface, and the second outer skin being located on the second surface; a panel restraining step of sandwiching the panel and the repair patch from both surface sides of the first surface and the second surface and thereby restraining the panel; and a heating step (thermal curing step) of heating the adhesive while the panel is restrained.

10 Claims, 7 Drawing Sheets

METHOD AND APPARATUS FOR REPAIRING HONEYCOMB CORE SANDWICH PANEL

BACKGROUND OF THE INVENTION

1. Field of the Invention

The present invention relates to a method for repairing a honeycomb core sandwich panel having a configuration in which a honeycomb structured core is held between outer skins, and an apparatus for repairing the same.

2. Description of the Related Art

Since a honeycomb core sandwich panel in which thin outer skins are attached to both surfaces of a honeycomb structured core is lightweight and highly rigid, the honeycomb core sandwich panel is usually used for the structure of an aircraft. A composite material of FRP (fiber reinforced plastics) or the like is often used as the outer skin of the honeycomb core sandwich panel.

However, the thin outer skin is easily damaged by a lightning strike, or a flying object such as hail.

Japanese Patent Laid-Open No. 3-264356 discloses a method for repairing a honeycomb core sandwich panel in which a honeycomb structured core is held between FRP plates. When the core and the FRP plate are separated from each other, moisture existing in a separated portion between the core and the FRP plate is removed by decompressing the separated portion by vacuum drawing. The separated portion is then filled with resin for repair, so that the core and the FRP plate are bonded together without being disturbed by moisture.

When the honeycomb core sandwich panel is repaired, a repair material is disposed on a repair target portion that has been formed by damage. Thermosetting resin is used for the repair material. The repair material is heated and cured.

At this time, to reliably cure the repair material, the panel is maintained at a high temperature. Accordingly, moisture accumulated in cells or on partition walls of the core of the panel changes into water vapor to generate a high pressure within the cells. The panel may be destroyed by the pressure.

Even when moisture existing in the separated portion between the core and the FRP plate is removed as described in Japanese Patent Laid-Open No. 3-264356, moisture remains within the core. Thus, there is still a possibility that the panel is destroyed at the time of heating for repair.

Therefore, to reliably prevent the panel from being destroyed, a drying step for the purpose of sufficiently drying the core is performed before heating. However, it takes a very long time to repair the panel due to the drying step.

An object of the present invention is to reduce a time required for repairing the honeycomb core sandwich panel while avoiding the destruction of the honeycomb core sandwich panel at the time of repair.

SUMMARY OF THE INVENTION

A repair method according to the present invention is a method for repairing a honeycomb core sandwich panel having a configuration in which a honeycomb structured core with a plurality of cells is held between a first outer skin and a second outer skin, the method including: a repair material disposing step of disposing a repair material on at least one of surfaces where the first outer skin is located on first surface, and the second outer skin is located on the second surface, of the honeycomb core sandwich panel; a panel restraining step of sandwiching the honeycomb core sandwich panel and the repair material from both surface sides of the first surface and the second surface and thereby restraining the honeycomb core sandwich panel; and a heating step of heating the repair material while the honeycomb core sandwich panel is restrained.

In the present invention, after the honeycomb core sandwich panel (referred to as panel below) is held from both surface sides and thereby restrained, the repair material may be heated and cured.

When the repair material is heated, the heat is also transferred to the panel via the repair material. Thus, the temperature of the panel is increased. Even when the internal pressure of the cells is increased due to evaporation of moisture accumulated in the cells and on partition walls of the core, a force for restraining the panel resists the internal pressure of the cells. Therefore, the outer skin does not separate from the core, and the panel can be prevented from being destroyed.

Accordingly, a step of drying the core of the panel in advance so as to prevent the destruction thereof can be omitted. Also, the time required for repairing the panel can be considerably reduced.

The repair materials used in the present invention have various forms.

Examples of the repair method in which a composite material is used for the repair material include a method (wet lay-up) of impregnating fiber sheets with liquid thermosetting resin, laminating the fiber sheets on a repair target portion, and curing the resin by heating, and a method of laminating a semi-cured intermediate material (a prepreg) on the repair target portion, and curing the intermediate material by heating. There is also a method of using a repair patch (a pre-cured patch) that is preliminarily thermally cured, and bonding the repair patch to the repair target portion with a thermosetting adhesive.

Therefore, the repair material corresponds to, for example, a pre-cured patch that is preliminarily cured and made of thermosetting resin, and a thermosetting adhesive that bonds the pre-cured patch to the repair target portion.

As another form, the repair material corresponds to a semi-cured prepreg made of thermosetting resin, and a thermosetting adhesive that bonds the prepreg to the repair target portion.

As yet another form, the repair material corresponds to liquid thermosetting resin and fiber, both of which are used in the case of performing the wet lay-up.

In the repair method according to the present invention, in the panel restraining step, a fluid body that contains an object having fluidity may be interposed between at least one of a restraint device for restraining the panel and first surface of the panel, and the restraint device and the second surface of the panel.

Accordingly, the fluid body is deformed following the shapes of both the surface of the panel and the surface of the restraint device, to fill a space surrounded by the panel and the restraint device. The force for restraining the panel is evenly dispersed over the panel surface via the fluid body. Therefore, the restraining force can act in a balanced manner on the pressure generated in any of the cells of the core.

Consequently, even when the panel is formed in a curved shape, the destruction of the panel due to the increase in the internal pressure of the cells can be prevented.

In the repair method according to the present invention, in the panel restraining step, a heating device that heats the repair material may be preferably interposed between a restraint device for restraining the panel and the repair material disposed on the surface of the panel.

Accordingly, the heating device can be prevented from being displaced with respect to the repair material by the force for restraining the panel. Thereby, the repair material can be reliably heated.

As another aspect, the present invention provides a method for repairing a honeycomb core sandwich panel having a configuration in which a honeycomb structured core with a plurality of cells is held between a first outer skin and a second outer skin, the method including: a repair material disposing step of disposing a repair material on at least one of surfaces where the first outer skin is located on first surface, and the second outer skin is located on the second surface, of the honeycomb core sandwich panel; a panel restraining step of sandwiching the honeycomb core sandwich panel and the repair material from both surface sides of the first surface and the second surface and thereby restraining the honeycomb core sandwich panel; and a step of heating and melting the repair material while the honeycomb core sandwich panel is restrained, and thereafter solidifying the repair material.

In the present invention, the repair material is also heated after the panel is held from both surface sides and thereby restrained. Thus, a force for restraining the panel resists the internal pressure of the cells that is increased along with an increase in the temperature of the panel. Therefore, the panel can be prevented from being destroyed.

The present invention may also be applied to a repair apparatus.

A repair apparatus according to the present invention is an apparatus for repairing a honeycomb core sandwich panel having a configuration in which a honeycomb structured core with a plurality of cells is held between a first outer skin and a second outer skin, the apparatus including: a restraint device that sandwiches the honeycomb core sandwich panel and a repair material from both surface sides of a first surface and a second surface of the honeycomb core sandwich panel and thereby restrains the honeycomb core sandwich panel; and a heating device that heats and cures the repair material, or heats and melts the repair material and thereafter solidifies the repair material while the honeycomb core sandwich panel is restrained by the restraint device.

The present invention can reduce the time required for repairing the honeycomb core sandwich panel while avoiding the destruction of the honeycomb core sandwich panel due to the increase in the internal pressure of the cells associated with the heating at the time of repair.

DETAILED DESCRIPTION OF THE PREFERRED EMBODIMENT

In the following, the present invention is described in detail based on embodiments shown in the accompanying drawings.

First Embodiment

First, the configuration of a honeycomb core sandwich panel obtained by repair is described.

Figure 1:
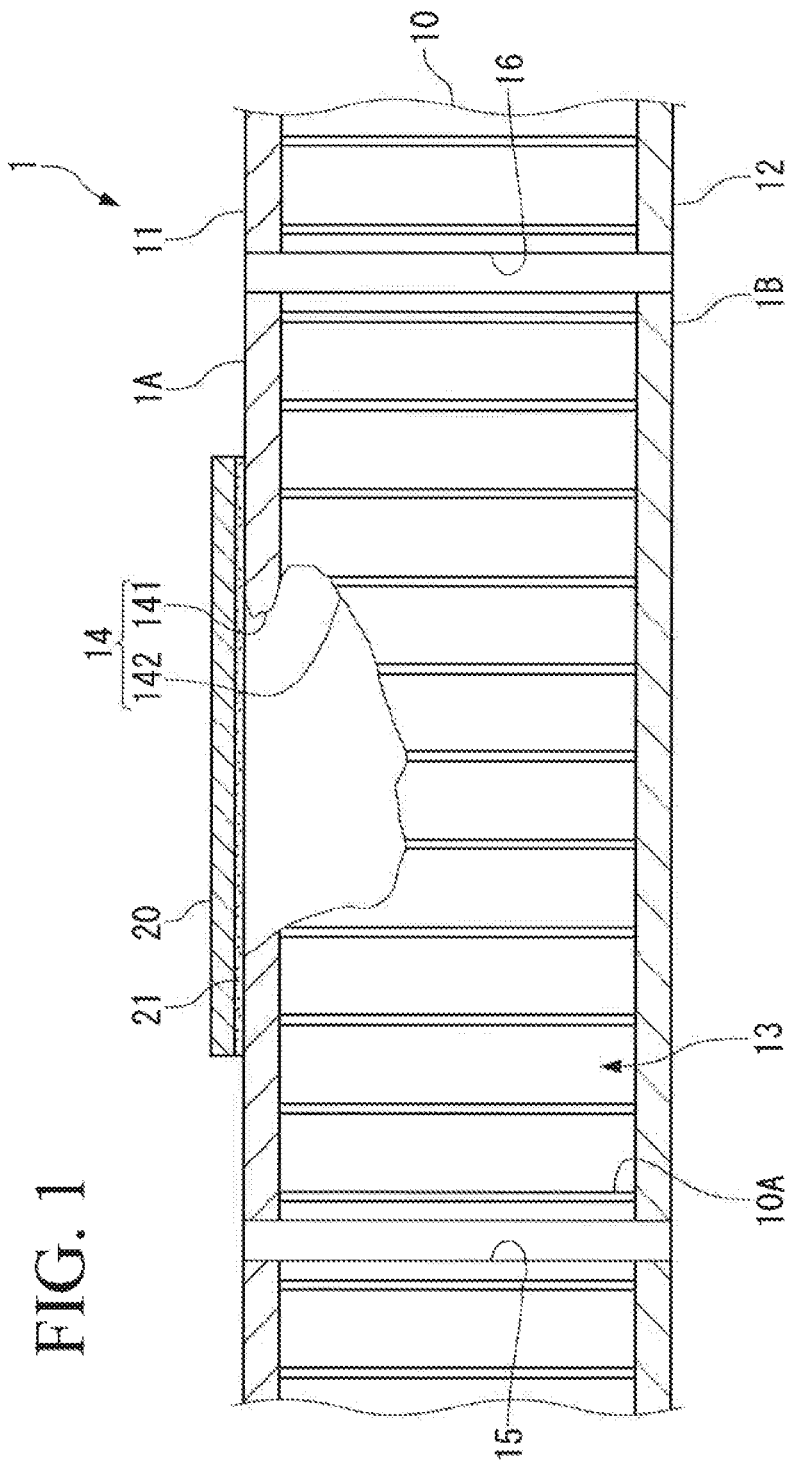
FIG. 1 is a sectional view schematically illustrating a honeycomb core sandwich panel according to a first embodiment.

A honeycomb core sandwich panel 1 shown in FIG. 1 is used for an outer plate (skin) that constitutes an outer surface of a wing or a fuselage of an aircraft.

The honeycomb core sandwich panel 1 (referred to as panel 1 below) has a configuration in which a honeycomb structured core (a core material) 10 is held between a first outer skin 11 and a second outer skin 12. The panel 1 may also include a layer other than the core 10, the first outer skin 11, and the second outer skin 12.

The core 10 includes partition walls 10A that form a plurality of cells 13 having a hexagonal cross section. The core 10 is made of a composite material, a metal, a resin or the like.

Since each of the cells 13 has an airspace therein, the core 10 includes air. Moisture is included in the air. Moisture is also retained on the partition walls 10A. Dew condensation of water may occur on the surfaces of the partition walls 10A. Therefore, moisture is accumulated within the core 10 (in the cells 13 and on the partition walls 10A).

The first outer skin 11 and the second outer skin 12 are respectively made of a composite material, a metal, a resin or the like. The first outer skin 11 and the second outer skin 12 are bonded to end surfaces of the core 10. Openings surrounded by the partition walls 10A are closed by the first outer skin 11 and the second outer skin 12 to seal the cells 13.

The panel 1 may be damaged by receiving the impact of a lightning strike, hail or the like. In this case, a repair target portion 14 that requires repair is formed in the panel 1.

The repair target portion 14 is formed when a flying object such as hail passes through the first outer skin 11, and enters into the core 10. A damage hole 141 that penetrates in the thickness direction is formed on the first outer skin 11. A damage recess 142 that communicates with the damage hole 141 is formed in the core 10.

The repair target portion 14 denotes a damaged portion inside the damage hole 141 and the damage recess 142, and a predetermined range including the surrounding of the damaged portion.

When the damage hole 141 is formed, rainwater or cleaning water enters into the core 10 through the damage hole 141. More moisture is thereby accumulated within the core 10.

The repair target portion 14 is covered with a plate-like repair patch 20 that is made of a composite material. The rear surface of the repair patch 20 is bonded to the first outer skin 11 around the damage hole 141.

The periphery of the damage hole 141 in the first outer skin 11 is preferably formed, by sanding and cleaning, into a surface suitable for bonding to the repair patch 20.

In the present embodiment, the skin damage hole 141 is closed by the repair patch 20 without filling the core damage recess 142. However, the core damage recess 142 may also be filled with a repair member.

The repair patch 20 is fabricated by laminating sheets of carbon fiber, impregnating the laminate with thermosetting resin such as epoxy resin and polyimide resin, and curing the thermosetting resin by heating. The repair patch 20 is a pre-cured patch that is preliminarily cured before repair. The repair patch 20 is formed into a shape to follow the shape of first surface 1A that is one of the surfaces in the thickness direction of the panel 1.

Glass fiber may also be used for the repair patch 20 instead of the carbon fiber. Any type of fiber may be used. The repair patch 20 may also be fabricated from metal.

A conductive lightning-resistant material formed into a sheet-like shape may also be laminated on the repair patch 20.

An adhesive layer 21 made of thermosetting resin is interposed between the repair patch 20 and the first skin 11. The adhesive layer 21 constitutes a repair material together with the repair patch 20.

The repair patch 20 and the first outer skin 11 are bonded together with the adhesive layer 21, and thereby integrated together.

Figure 2:
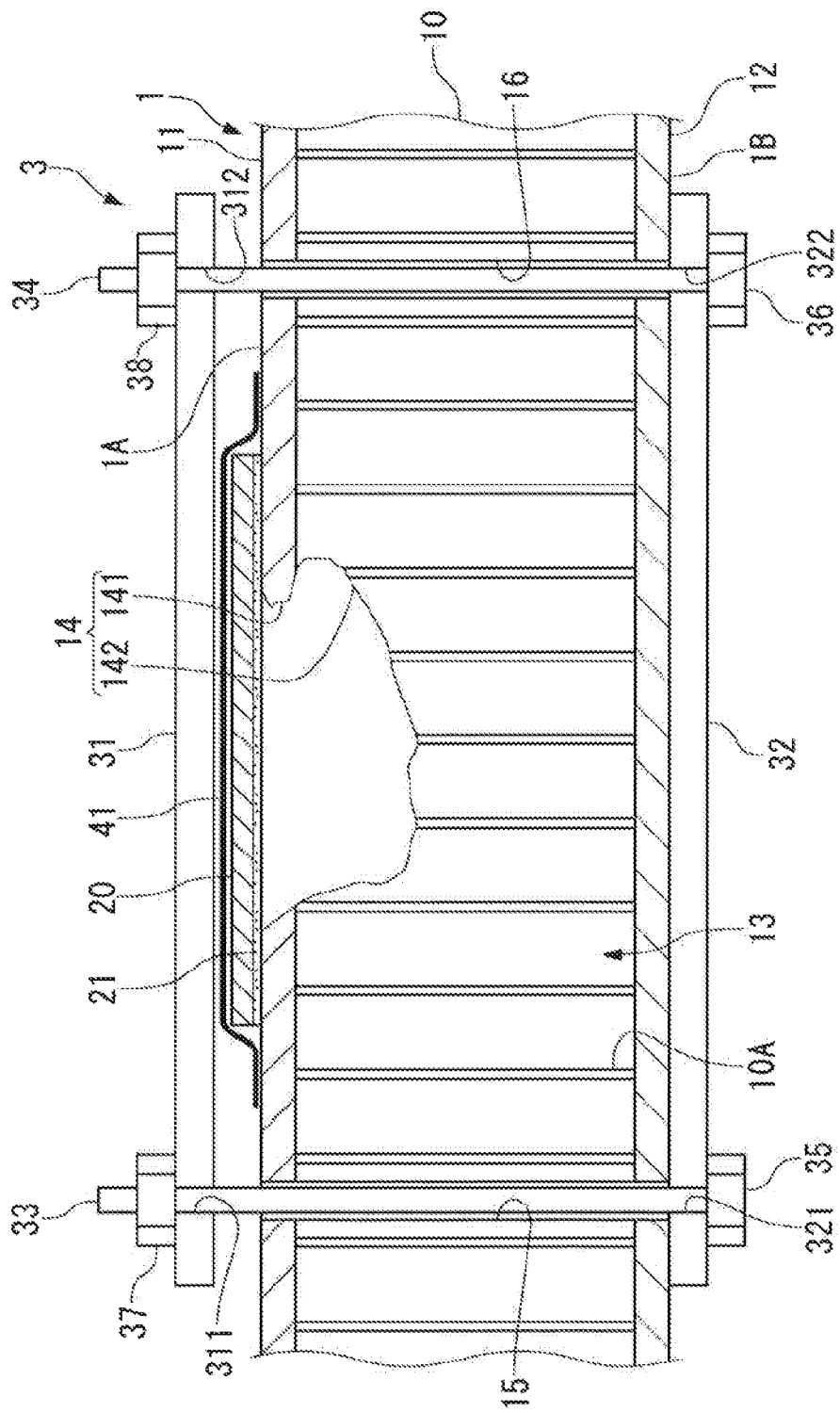
FIG. 2 is a view illustrating a restraint jig used in a method for repairing the honeycomb core sandwich panel.

Next, a metal restraint jig 3 used for repairing the panel 1 is described by reference to FIG. 2.

The restraint jig 3 restrains the panel 1 in the thickness direction. The restraint jig 3 includes a first plate 31 and a second plate 32 facing each other across the panel 1, and two rods 33 and 34 that couple the first plate 31 and the second plate 32 together.

The first plate 31 is arranged on the first surface 1A of the panel 1 (the surface of the first outer skin 11) to which the repair patch 20 is bonded so as to cover the repair patch 20 and a predetermined range around the repair patch 20. The first plate 31 has any shape such as a circular, oval, or rectangular shape.

When the first surface 1A has a flat shape, the first plate 31 is formed into a flat shape. When the first surface 1A has a curved shape, the first plate 31 is formed into a corresponding curved shape.

Through holes 311 and 312 are formed penetrating the first plate 31 in the thickness direction at positions apart from each other on the first plate 31.

The second plate 32 is arranged on the second surface 1B of the panel 1 (the surface of the second outer skin 12) located on the opposite side to the first surface 1A so as to cover a predetermined range on the second surface 1B including a region where the repair patch 20 is projected onto the second surface 1B. The second plate 32 in the present embodiment is formed into the same shape and the same size as the first plate 31, and arranged with its flat surface center aligned with the flat surface center of the first plate 31.

When the second surface 1B has a flat shape, the second plate 32 is formed into a flat shape. When the second surface 1B has a curved shape, the second plate 32 is formed into a corresponding curved shape.

Through holes 321 and 322 are formed penetrating the second plate 32 in the thickness direction at the positions respectively corresponding to the through holes 311 and 312 of the first plate 31.

The rods 33 and 34 penetrate the panel 1 and the first and second plates 31 and 32 near outer peripheral portions of the first plate 31 and the second plate 32.

The rod 33 is inserted into the through holes 311 and 321, and a through hole 15 formed in the panel 1. The rod 34 is inserted into the through holes 312 and 322, and a through hole 16 formed in the panel 1.

Fixtures 35 and 36 having a larger diameter than the rods 33 and 34 are respectively fixed to one ends (lower ends in the drawing) of the rods 33 and 34. Nuts 37 and 38 are also respectively provided at the other ends (upper ends in the drawing) of the rods 33 and 34. When the nuts 37 and 38 are tightened against the first plate 31, the panel 1 is held between the first plate 31 and the second plate 32 and thereby restrained. The distance between the fixtures 35 and 36, and the nuts 37 and 38, is set to be more than the thickness of the panel 1.

Figure 3:
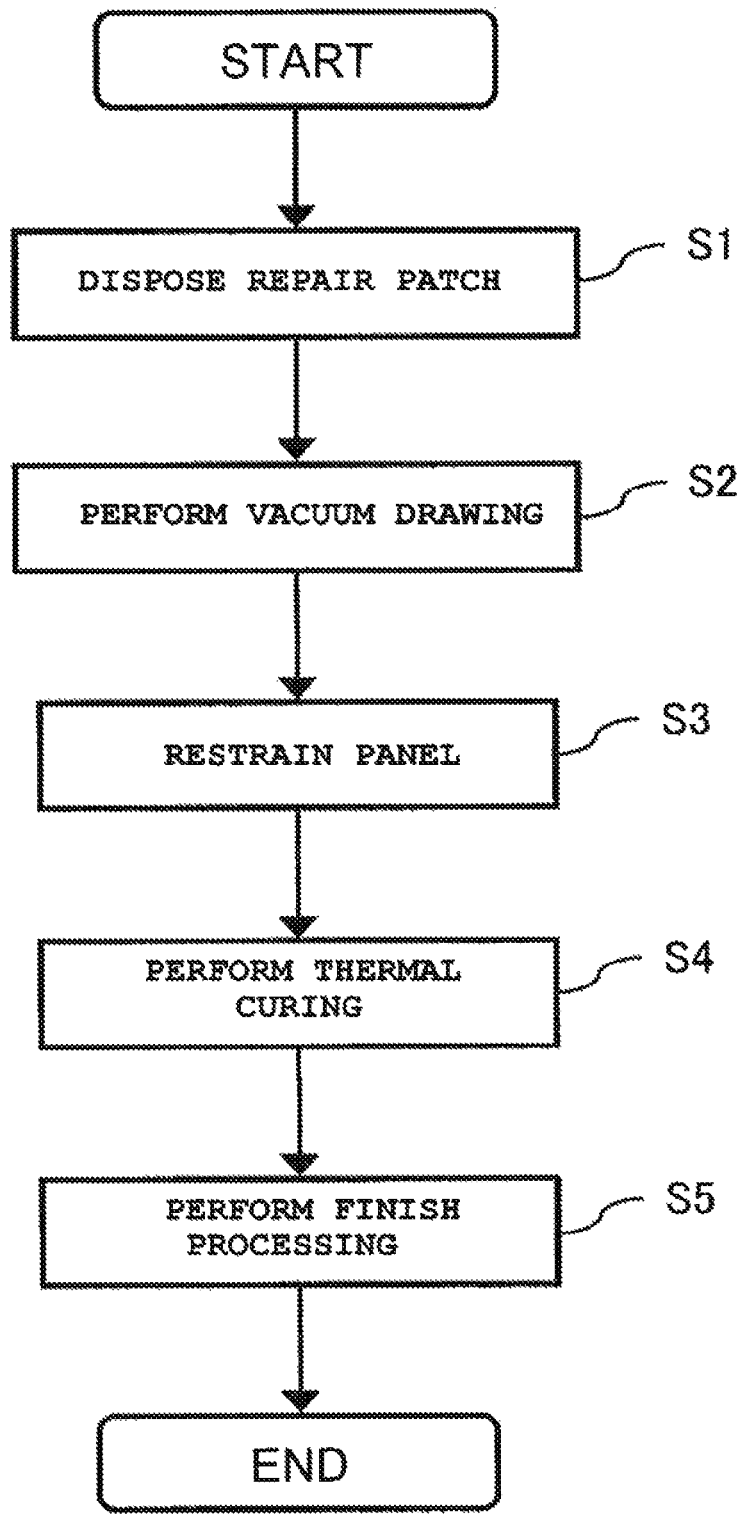
FIG. 3 is a flow chart illustrating a procedure for repairing the honeycomb core sandwich panel.

In the following, a method for repairing the honeycomb core sandwich panel 1 is described by reference to FIG. 3.

First, an adhesive 21A containing thermosetting resin formed into a film-like shape, and the repair patch 20 are disposed on the first surface 1A of the panel 1 to cover the repair target portion 14 (repair patch disposing step S1).

The adhesive 21A may be formed into a shape similar to that of the repair patch 20 as shown in the drawing, and also into an annular shape along the periphery of the damage hole 141.

Subsequently, the repair patch 20 and its surrounding region are covered with a heat-resistant bag film 41. A gap between the bag film 41 and the first surface 1A is sealed. Vacuum drawing is then performed through a valve (not shown) provided in the bag film 41 (vacuum drawing step S2).

The repair patch 20 is pressed against the first surface 1A due to a differential pressure between inside the bag film 41 decompressed by the vacuum drawing and the external atmosphere. And thereby the repair patch 20 can be uniformly brought into close contact with the first surface 1A via the adhesive 21A.

Subsequently, the restraint jig 3 is mounted on the panel 1 to restrain the panel 1 from both surface sides of the first surface 1A and the second surface 1B (panel restraining step S3).

The through hole 15 into which the rod 33 is inserted, and the through hole 16 into which the rod 34 is inserted are formed in advance in the panel 1. An opening diameter of each of the through holes 15 and 16 is set to a dimension acceptable in ensuring a strength required for the panel 1 during cruising. The opening diameter may not necessarily correspond to the opening of each cell 13.

To mount the restraint jig 3 on the panel 1, first, the first plate 31 is arranged on the first surface 1A and the second plate 32 is arranged on the second surface 1B. The repair patch 20 is interposed between the first plate 31 and the first surface 1A.

After that, each of the rods 33 and 34 is passed through the first plate 31, the panel 1, and the second plate 32, and the nuts 37 and 38 are tightened respectively. The panel 1 and the repair patch 20 are thereby held from both surface sides, and restrained. When the nuts 37 and 38 are tightened, the panel 1 is compressed by the first plate 31 and the second plate 32. Accordingly, the first surface 1A of the panel 1 is pressurized, and the second surface 1B of the panel 1 is also pressurized.

After the panel 1 is brought into a restrained state in the thickness direction as described above, the repair patch 20 is heated to cure the adhesive 21A (thermal curing step S4).

To heat the repair patch 20 via the first plate 31, for example, a heater mat 45 that incorporates a heater may be placed on the first plate 31, or hot air may be blown toward the first plate 31 with a heat gun. An oven capable of accommodating the panel 1 may also be used to heat the repair patch 20. Various known heating devices may be used as a heat source for heating the repair patch 20.

In the thermal curing step S4, the repair patch 20 is heated at a heating temperature and for a heating time enough to reliably cure the adhesive 21A. It is also preferable to heat the repair patch 20 while performing the vacuum drawing.

When the panel 1 is pressurized by tightening the nuts 37 and 38, the repair patch 20 is pressed against the first surface 1A. Thus, the restraint jig 3 also helps the repair patch 20 come into close contact with the first surface 1A via the adhesive 21A. Therefore, the degree of vacuum of the vacuum drawing can be reduced.

The heat emitted from the heat source for heating the repair patch 20 is also transferred to the panel 1 via the repair patch 20 and the adhesive 21A. Thus, the temperature of the panel 1 is increased. The moisture accumulated within the core 10 is thereby evaporated, and therefore the internal pressure of the cells 13 is increased since the openings of the cells 13 are closed by the outer skins 11 and 12.

However, a force of the restraint jig 3 for restraining the panel 1 resists the internal pressure of the cells 13. Thus, even when the internal pressure of the cells 13 is increased, the first outer skin 11 and the second outer skin 12 are not separated from the core 10. Accordingly, the panel 1 can be prevented from being destroyed.

After that, the restraint jig is removed. The through holes 15 and 16 of the panel 1 are filled, if necessary, and finish processing of the repair patch 20 and the surrounding region thereof is performed (finish processing step S5). The repair of the panel 1 is thereby completed.

In the repair method according to the present embodiment, when the repair patch 20 is bonded to the repair target portion 14 of the panel 1, the panel 1 is restrained from both surface sides of the first surface 1A and the second surface 1B. Accordingly, the destruction of the panel 1 due to the increase in the internal pressure of the cells 13 can be prevented. It is thus not necessary to perform a step of drying the core 10 in advance. It takes a very long time to sufficiently dry the core 10 in which moisture is retained in the air within the plurality of cells 13 and on the partition walls 10A. In accordance with the repair method in the present embodiment, since the drying step is omitted, a time required for repairing the panel 1 can be considerably reduced.

Therefore, the repair method according to the present embodiment is suitable for repairing the outer skin of an aircraft which is strongly desired to fly on schedule.

The repair procedure described above is merely an example. As another procedure, the vacuum drawing may be started after restraining the panel 1 by the restraint jig 3, and the repair patch 20 may be heated while the vacuum drawing is being performed.

Thermoplastic resin such as nylon, polyethylene, polystyrene, and polyvinyl chloride may also be used for the repair material disposed on the repair target portion 14.

For example, when a prepreg obtained by semi-curing fiber impregnated with thermoplastic resin is used as the repair material, a repair material disposing step of disposing the repair material on the first surface 1A of the panel 1, a panel restraining step of sandwiching the panel 1 and the repair material from both surface sides of the panel 1 and thereby restraining the panel 1, and a step of heating and melting the repair material while the panel 1 is restrained, and thereafter solidifying the repair material are performed. In this case, the same effects as those in the case of using the thermosetting resin can be obtained.

[Modification of the First Embodiment]

The repair target portion of the panel 1 may be formed penetrating the panel 1 in the thickness direction in some cases.

Figure 4:
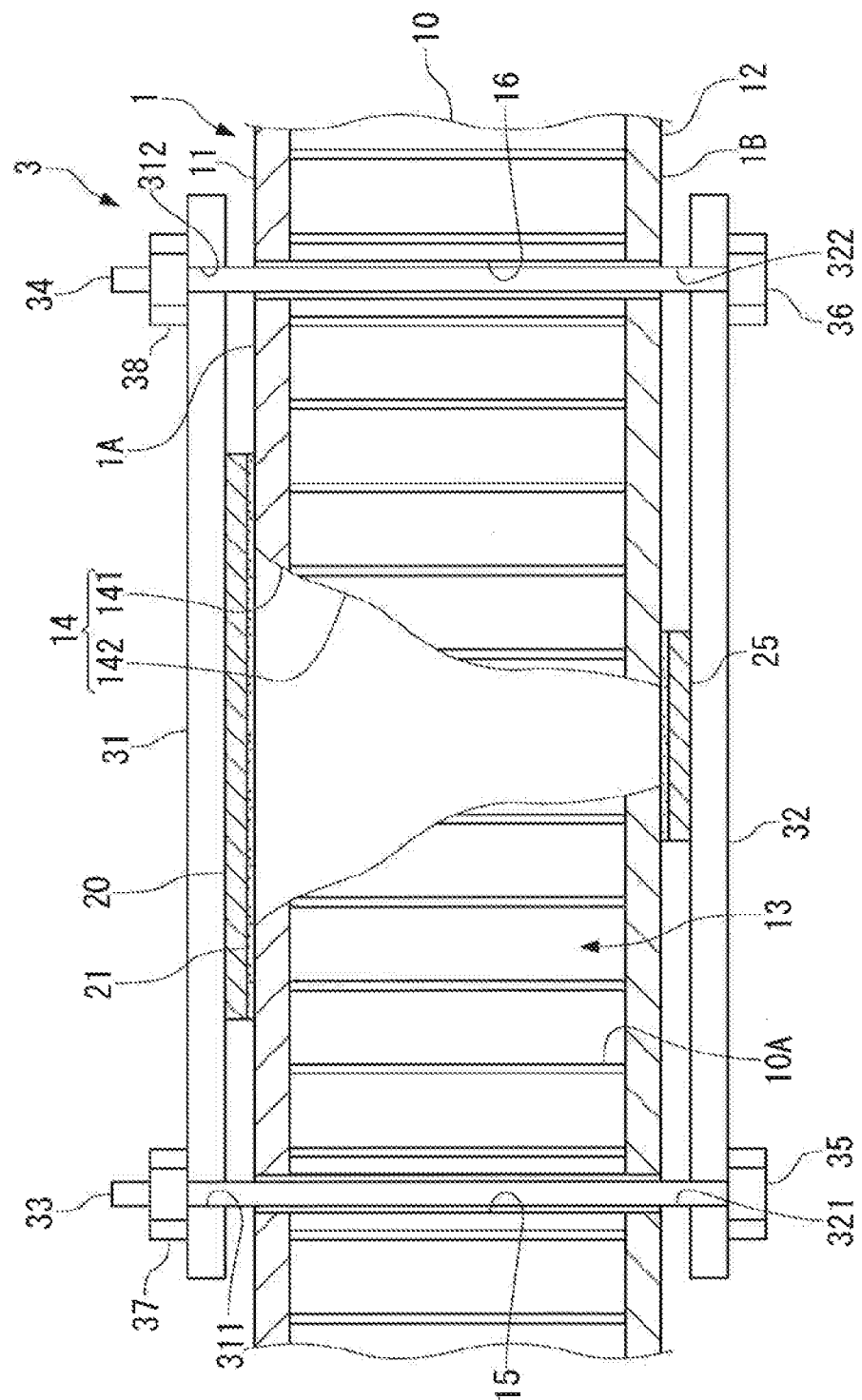
FIG. 4 is a view illustrating a modification of the first embodiment.

At this time, as shown in FIG. 4, the repair patch 20 is disposed on the first surface 1A of the panel 1, and a repair patch 25 is disposed on the second surface 1B of the panel 1. The panel 1 is then held and restrained from both surface sides thereof by the restraint jig 3. Accordingly, the destruction of the panel 1 at the time of repair can be prevented similarly to the above description.

When the vacuum drawing is performed, one of the repair patches, that is, the repair patch 25 is bonded to the panel 1 before bonding the other repair patch, that is, the repair patch 20 thereto. The opening of the repair target portion 14 on the side of the second surface 1B is sealed by the repair patch 25, so that the vacuum drawing can be performed with the bag film 41 overlaid on the repair patch 20.

Second Embodiment

Figure 5:
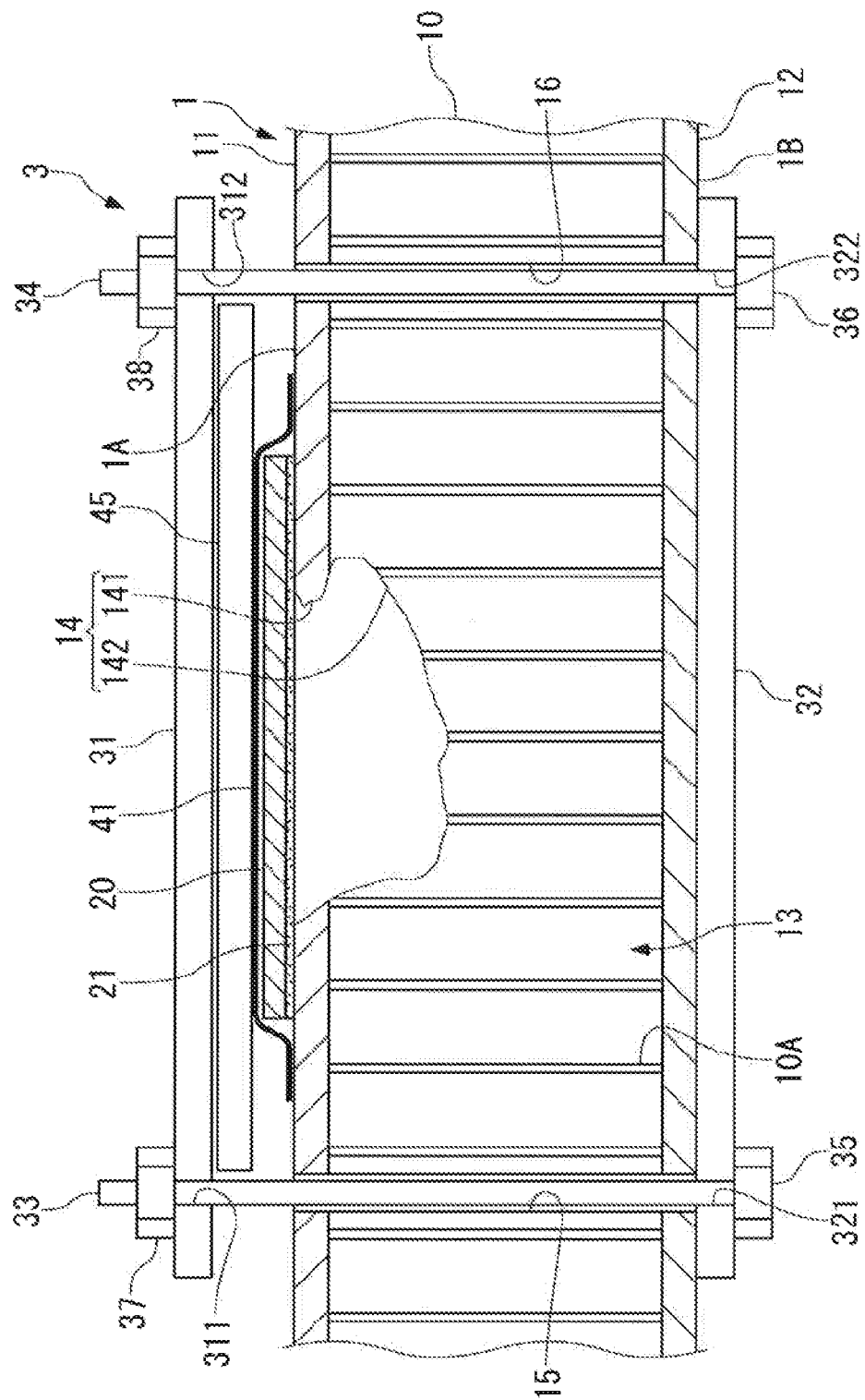
FIG. 5 is a view illustrating a restraint jig and a heater mat used in a repair method according to a second embodiment.

Next, a second embodiment of the present invention is described by reference to FIG. 5.

Differences from the first embodiment are mainly described in the second and subsequent embodiments. The same components as those of the first embodiment are assigned the same reference numerals.

In the second embodiment, the heater mat 45 is interposed between the first plate 31 of the restraint jig 3 and the repair patch 20.

The heater mat 45 incorporates a heater in a rubber mat having a substantially plate-like shape.

In the present embodiment, after the adhesive 21A and the repair patch 20 are arranged on the first surface 1A of the panel 1 to cover the repair target portion 14, the bag film 41 is overlaid on the repair patch 20 to perform the vacuum drawing similarly to the first embodiment.

Subsequently, the heater mat 45 is placed on the repair patch 20 from above the bag film 41.

Moreover, the panel 1 is held from both surface sides and thereby restrained by the restraint jig 3 similarly to the first embodiment. The heater mat 45 is preferably pressurized against the repair patch 20 by the restraint jig 3.

The heater mat 45 may be attached to the first plate 31 in advance. Accordingly, the heater mat 45 and the first plate 31 can be mounted on the panel 1 at the same time.

Subsequently, the heater mat 45 is energized to heat the repair patch 20. The adhesive 21A is thereby cured. At that time when the heater mat 45 is pressurized by the restraint jig 3, the heater mat 45 is in close contact with the repair patch 20 via the bag film 41. Thus, the heat emitted from the heater mat 45 is efficiently transferred to the repair patch 20.

When the temperature of the panel 1 is increased by the heat from the heater mat 45, the moisture within the core 10 is evaporated. The inner pressure of the cells 13 is thereby increased. However, since the panel 1 is restrained in the thickness direction, the panel 1 can be prevented from being destroyed.

In the present embodiment, such control as to maintain the temperature of the repair patch 20 at a target constant temperature that does not fall below the temperature required for curing the adhesive 21A may also be performed. To this end, a temperature sensor that detects the temperature of the repair patch 20, and a control unit that adjusts the output of the heater mat 45 based on the temperature detected by the temperature sensor are used. The control unit adjusts the output of the heater mat 45 such that the temperature of the repair patch 20 is maintained at a target constant temperature (e.g., 120° C.) that does not fall below the temperature required for curing the adhesive or largely exceed the temperature based on the temperature detected by the temperature sensor.

Accordingly, the adhesive 21A can be reliably cured. It is also possible to avoid an excessive increase in the temperature inside the core 10 to promote the evaporation of the moisture within the core 10. The first skin 11 made of a composite material or resin can also be prevented from being deformed by overheating.

Third Embodiment

Figure 6:
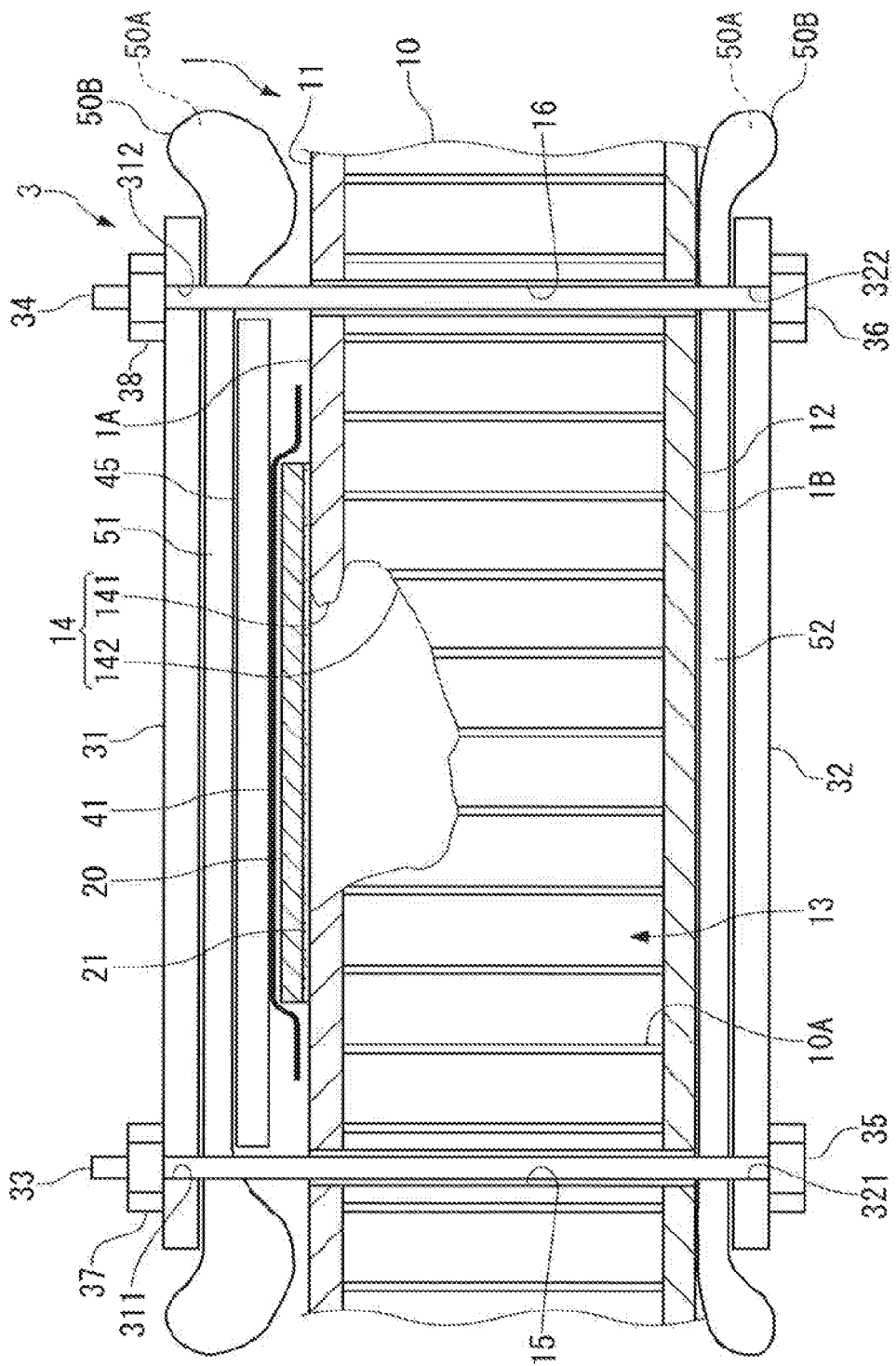
FIG. 6 is a view illustrating a restraint jig and a fluid body used in a repair method according to a third embodiment.

Next, a third embodiment of the present invention is described by reference to FIG. 6.

In the third embodiment, a first fluid body 51 and a second fluid body 52 are held together with the panel 1 by the restraint jig 3.

Each of the first fluid body 51 and the second fluid body 52 includes a fluid 50A and a bag 50B that contains the fluid 50A.

The fluid 50A is liquid such as water and oil, or fine particulates, and has fluidity.

The bag 50B is flexible. The bag 50B is deformed when the fluid 50A enclosed therein changes its shape according to the shape of an object coming into contact with the bag 50B.

The bag 50B is made of a material, such as rubber, fabric coated with rubber on its inner surface, and tight fabric, which does not tear or from which the fluid 50A does not leak out due to osmotic pressure even when pressurized by the restraint jig 3.

Materials that do not affect each other are selected for the bag 50B and the fluid 50A.

The first fluid body 51 is formed in the same size as the flat surface size of the first plate 31. The first fluid body 51 is arranged between the first plate 31 and the first surface 1A.

The second fluid body 52 is formed in the same size as the flat surface size of the second plate 32. The second fluid body 52 is arranged between the second plate 32 and the second surface 1B.

The first fluid body 51 is heated to a high temperature by the heat applied to the repair patch 20. Thus, a heat-resistant and incombustible material is selected at least for the fluid 50A and the bag 50B of the first fluid body 51. For example, silicone oil may be used for the fluid 50A, and heat-resistant rubber containing carbon fiber or glass fiber may be used for the bag 50B.

Also in the present embodiment, the adhesive 21A and the repair patch 20 are arranged on the first surface 1A of the panel 1 to cover the repair target portion 14, and the bag film 41 is overlaid on the repair patch 20 to perform the vacuum drawing.

Subsequently, the heater mat 45 is placed on the repair patch 20 from above the bag film 41, and the first fluid body 51 is also placed on the heater mat 45. The first plate 31 is placed from above the first fluid body 51. The second fluid body 52 and the second plate 32 are also arranged on the second surface 1B of the panel 1.

After that, the nut 37 is tightened on the rod 33, and the nut 38 is tightened on the rod 34. The first plate 31 and the second plate 32 are thereby coupled.

The first fluid body 51 is thereby deformed following both the surface of the first plate 31 and the first surface 1A, to fill a space surrounded by the first plate 31 and the first surface 1A. The first fluid body 51 comes into close contact with the first plate 31 and the first surface 1A.

The second fluid body 52 is also deformed following both the surface of the second plate 32 and the second surface 1B, to fill a space surrounded by the second plate 32 and the second surface 1B. The second fluid body 52 comes into close contact with the second plate 32 and the second surface 1B.

Subsequently, the heater mat 45 is energized to heat the repair patch 20. The adhesive 21A is thereby cured. The moisture within the core 10 is evaporated along with the increase in the temperature of the panel 1 at this time. And thereby the inner pressure of the cells 13 is increased.

At that time, the restraining force of the restraint jig 3 evenly acts on both of the first surface 1A and the second surface 1B via the first fluid body 51 and the second fluid body 52. Therefore, the restraining force can act in a balanced manner on the pressure generated in any of the cells 13 of the core 10.

In accordance with the present embodiment, the restraining force of the restraint jig 3 can be evenly dispersed over the panel 1 via the first fluid body 51 and the second fluid body 52. Thus, even when the panel 1 is formed in a curved shape, the destruction of the panel 1 due to the increase in the internal pressure of the cells 13 can be prevented.

Only one of the first fluid body 51 and the second fluid body 52 may be used depending on the shape of the panel 1. For example, when the first plate 31 and the second plate 32 have a flat shape, the first surface 1A of the panel 1 is formed in a curved shape, and the second surface 1B is formed in a flat shape, the first fluid body 51 may be interposed between the first surface 1A and the first plate 31 without using the second fluid body 52 for the side of the second surface 1B.

Figure 7A:
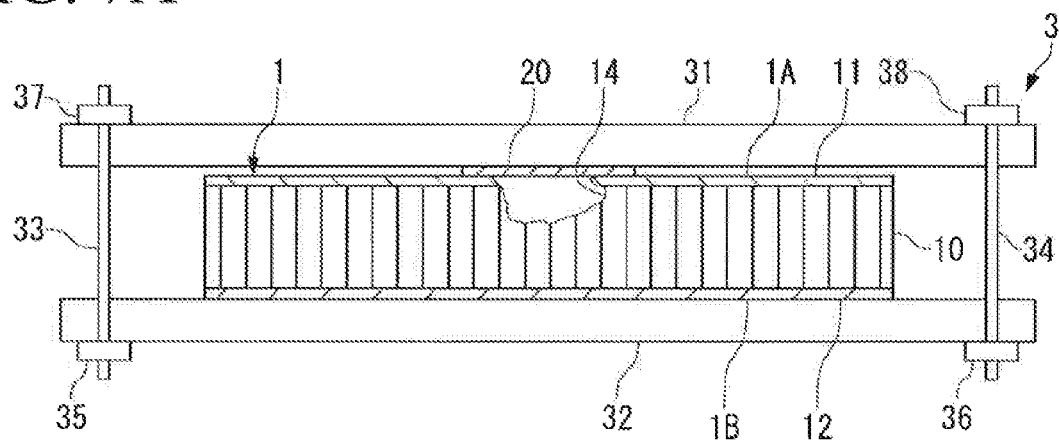
FIGS. 7A and 7B are views illustrating a restraint jig and a restraint device according to modifications of the present invention.

Modifications of the present invention are described by reference to FIGS. 7A and 7B.

In the aforementioned respective embodiments, it is necessary to form the through holes 15 and 16 penetrating the panel 1 in the thickness direction such that the rods 33 and 34 of the restraint jig 3 are inserted thereinto. However, when the first plate 31 and the second plate 32 are larger than the panel 1 as shown in FIG. 7A, the holes for inserting the rods 33 and 34 need to be formed only at the outer peripheral portions of the first plate 31 and the second plate 32, and do not need to be formed in the panel 1.

The panel 1 may also be restrained without using the rods 33 and 34.

Figure 7B:
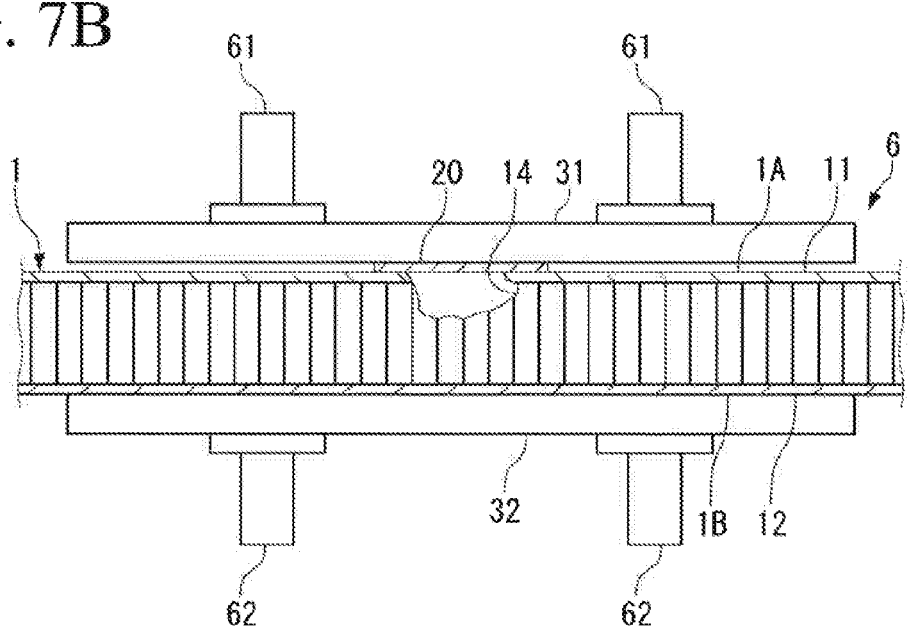

For example, a restraint device 6 shown in FIG. 7B comprises the first plate 31, the second plate 32, a jack 61 that presses the first plate 31, and a jack 62 that presses the second plate 32. By using the restraint device 6, the panel 1 can be restrained in the thickness direction without forming a hole in the panel 1 even when the first and second plates 31 and 32 are smaller than the panel 1.

Also, the restraint device used in the repair method according to the present invention may have any configuration as long as the panel 1 can be held from both surface sides and thereby restrained.

The repair material in the present invention may be formed by using a prepreg, or by wet lay-up.

In a method using the prepreg, the thermal curing step is performed in a similar manner to the above description so as to cure thermosetting resin contained in the prepreg.

In the wet lay-up, the thermal curing step is performed in a similar manner to the above description so as to cure liquid thermosetting resin.

In accordance with the present invention, the same actions and effects as described above can be obtained by sandwiching the honeycomb core sandwich panel from both surface sides and thereby restraining the honeycomb core sandwich panel, regardless of the form of the repair material.

The honeycomb core sandwich panel as a repair target object in the present invention may be configured in any form. For example, a plate material may be interposed between cores halved in the thickness direction of the panel.

By employing the repair method according to the present invention, not only the outer skin of the aircraft, but a wall material, a floor material, a ceiling material, and a door or the like provided in the aircraft may be repaired similarly to the aforementioned respective embodiments.

The present invention may also be applied to repair other structural objects or accessories of the aircraft.

Furthermore, the present invention may be applied to repair any objects to be repaired such as a wind turbine blade in addition to the members provided in the aircraft. The present invention may be applied to repair various objects damaged by impact, high temperature, abrasion, erosion or the like.

The constitutions described in the aforementioned embodiments may also be freely selected or changed into other constitutions than those described above without departing from the gist of the present invention.

What is claimed is:

1. A method for repairing a honeycomb core sandwich panel having a configuration in which a honeycomb structured core with a plurality of cells is held between a first skin and a second skin, the method comprising:
    a forming step of forming through holes in the honeycomb core sandwich panel;
    a repair material disposing step of disposing a repair material on at least one of a first surface and a second surface of the honeycomb core sandwich panel, the first skin being located on the first surface, and the second skin being located on the second surface;
    a panel restraining step of sandwiching the honeycomb core sandwich panel and the repair material from both surface sides of the first surface and the second surface, wherein during the panel restraining step the honeycomb core sandwich panel is brought into a restrained state, thereby restraining the honeycomb core sandwich panel; and
    a heating step of heating the repair material while the honeycomb core sandwich panel is restrained, wherein in the heating step, the repair material is heated and cured, or the repair material is heated and melted and thereafter solidified,
    wherein the heating step is conducted after the honeycomb core sandwich panel is brought into the restrained state, and
    wherein in the panel restraining step, a metal restraint device is used so that the honeycomb core sandwich panel and the repair material are sandwiched from both surface sides of the first surface and the second surface, and thereby the honeycomb core sandwich panel is restrained,
    the metal restraint device comprises at least a first plate to be arranged on the first surface side, a second plate to be arranged on the second surface side, and fixtures for coupling the first plate and the second plate, the fixtures being inserted into the through holes in the honeycomb core sandwich panel,
    the first plate has a flat shape when the first surface has a flat shape, and when the first surface has a curved shape, the first plate is configured so as to have a corresponding curved shape, and
    the second plate has a flat shape when the second surface has a flat shape, and when the second surface has a curved shape, the second plate is configured so as to have a corresponding curved shape, and wherein the metal restraint device is removed after the heating step.

2. The method according to claim 1, wherein in the heating step, the repair material is heated and cured.

3. The method according to claim 1, wherein in the panel restraining step, a fluid body that contains an object having fluidity is interposed at least one of the portions between the metal restraint device for restraining the panel and first surface of the panel and between the metal restraint device and the second surface of the panel.

4. The method according to claim 1, wherein in the panel restraining step, a heating device that heats the repair material is interposed between the metal restraint device for restraining the panel and the repair material disposed on the first surface or the second surface.

5. The method according to claim 1, wherein in the heating step, the repair material is heated and melted, and thereafter solidified.

6. The method according to claim 3, wherein the object having fluidity is liquid or fine particulates.

7. The method according to claim 1, wherein the first plate comprises a plate surface that extends across the repair material and applies pressure to the honeycomb core sandwich panel and repair material during the restraining step.

8. The method according to claim 1, wherein the repair material is heated by a heating device or heater provided between the honeycomb core sandwich panel and the first plate or second plate.

9. The method according to claim 1, wherein a first fluid body and a second fluid body are held together with the honeycomb core sandwich panel by the first and second plates of the metal restraint device.

10. The method according to claim 1, wherein prior to the panel restraining step:
    the repair material is covered with a bag film;
    a gap between the bag film and the first or second surface is sealed; and
    vacuum drawing is performed through a valve in the bag film.

* * * * *